A picture containing text

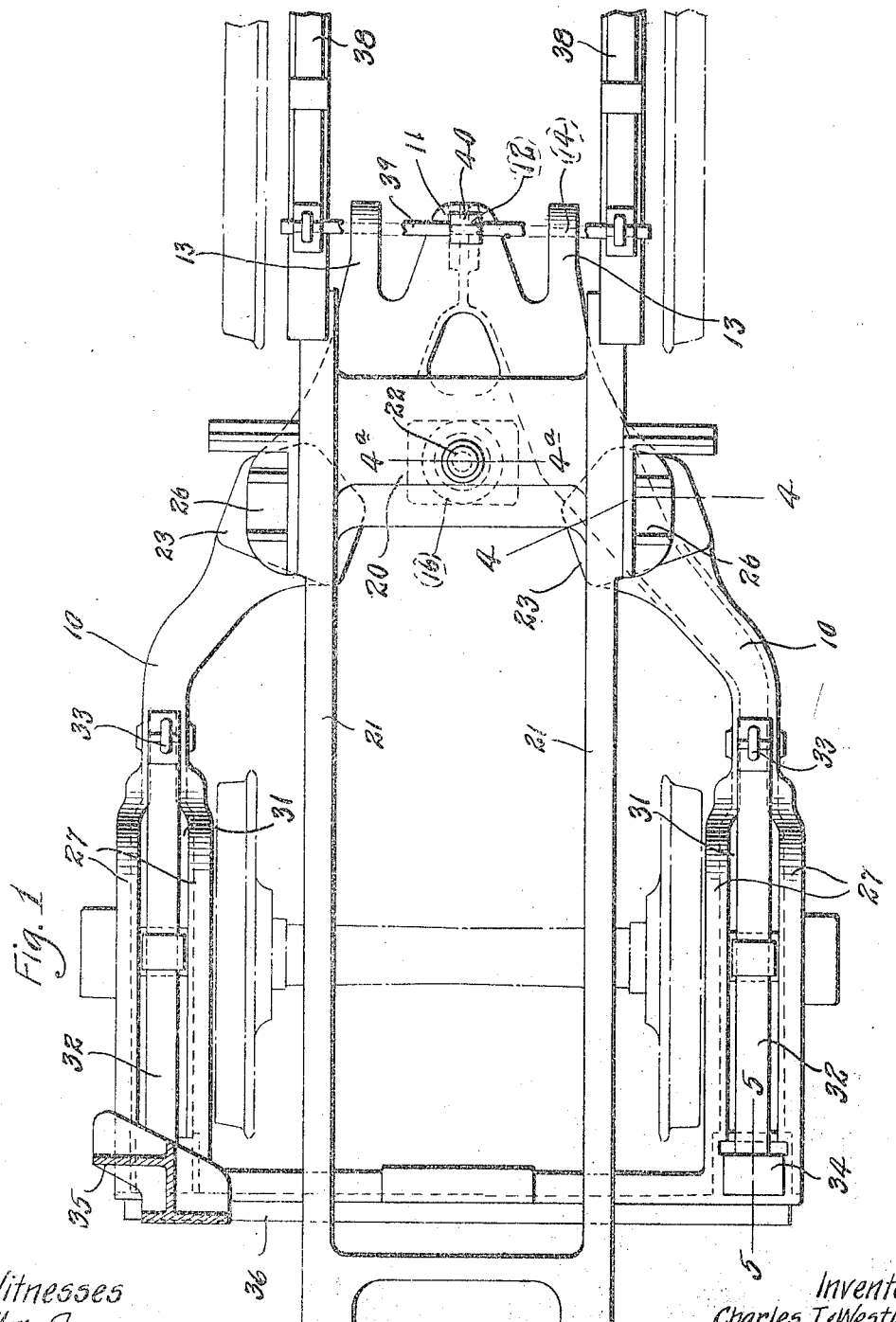

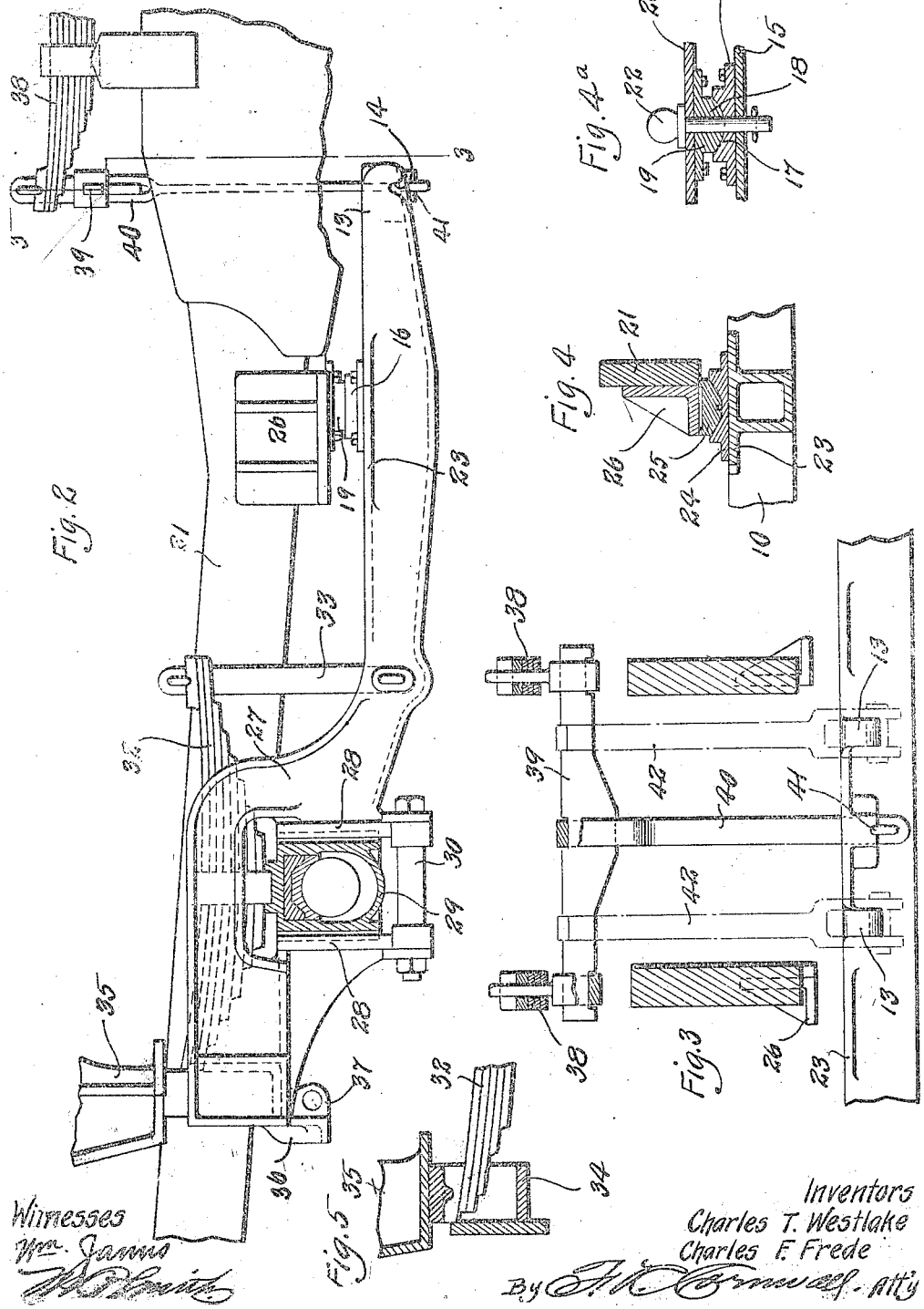

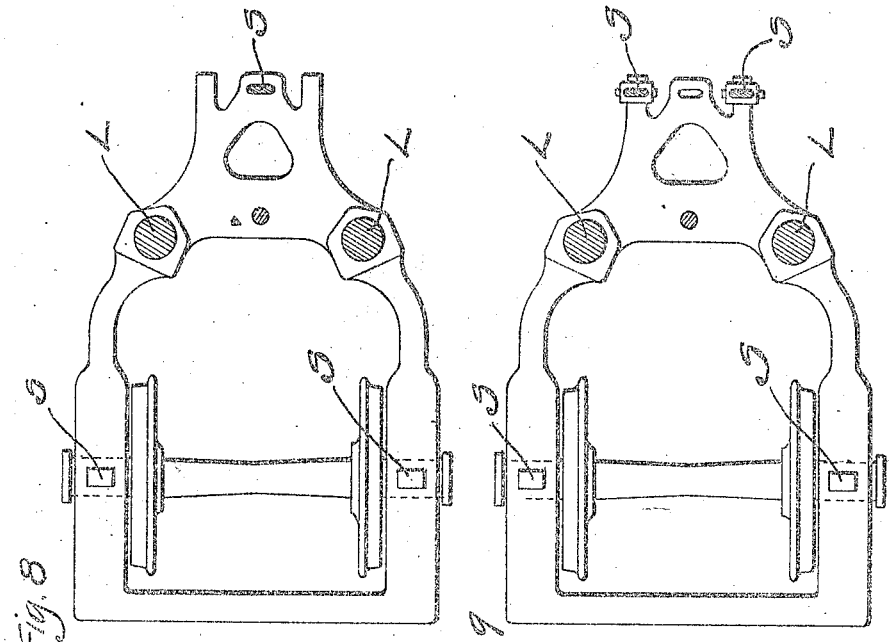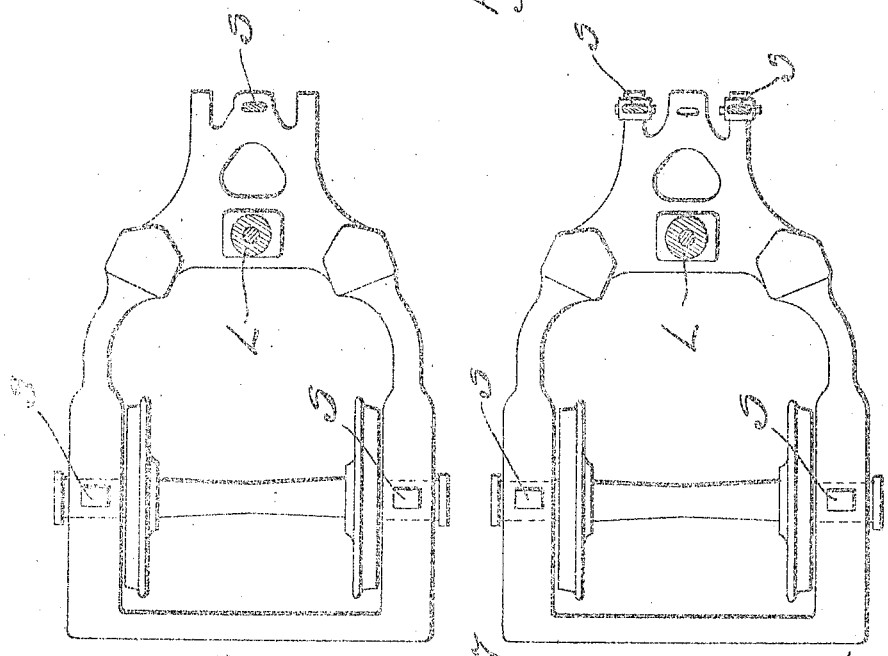

UNITED STATES PATENT OFFICE.

CHARLES F. FREDE AND CHARLES T. WESTLAKE, OF ST. LOUIS, MISSOURI, ASSIGNORS TO COMMONWEALTH STEEL COMPANY, OF ST. LOUIS, MISSOURI, A CORPORATION OF NEW JERSEY.

TRAILER-TRUCK FOR LOCOMOTIVES.

1,160,874.

Specification of Letters Patent.

Patented Nov. 16, 1915.

Application filed March 16, 1915. Serial No. 14,656.

*To all whom it may concern:*

Be it known that we, CHARLES F. FREDE and CHARLES T. WESTLAKE, a citizen of the United States, residing at St. Louis, Missouri, have invented a certain new and useful Improvement in Trailer-Trucks for Locomotives, of which the following is a full, clear, and exact description, such as will enable others skilled in the art to which it appertains to make and use the same, reference being had to the accompanying drawings, forming part of this specification, in which—

Figure 1 is a plan view of a locomotive trailer truck of our improved construction. Fig. 2 is a side elevational view of the truck frame and showing its connections with adjacent parts of the locomotive frame. Fig. 3 is a vertical section taken approximately on the line 3—3 of Fig. 2. Fig. 4 is a vertical section taken approximately on the line 4—4 of Fig. 1. Fig. 4ª is a vertical cross section taken approximately on the line 4ª of Fig. 1. Fig. 5 is a detail sectional view taken approximately on the line 5—5 of Fig. 1. Figs. 6, 7, 8 and 9 are diagrammatic views illustrating the various arrangements which can be carried out with a truck frame of our improved construction for supporting said frame from the locomotive frame and for the application of the load to said truck frame.

Our invention relates generally to trailer trucks for locomotives and more particularly to the type of trailer truck shown and described in Patent No. 1,099,376, dated June 9, 1914, the principal objects of our invention being to generally improve upon and simplify the construction of the existing types of trailer trucks; to provide improved means for yieldingly and flexibly supporting the trailer truck frame from the locomotive frame, and further to provide means for readily changing or shifting the points of application of the load to the truck frame as may be required under variable conditions.

With the foregoing and other objects in view, our invention consists in certain novel features of construction and arrangement of parts, hereinafter more fully described and claimed.

As shown in the accompanying drawings, the frame of our improved truck is formed in a single piece, preferably by casting, but it will be readily understood that this frame may be of built-up or assembled construction.

The frame includes a pair of side members 10 which converge and unite at their forward ends to form a bracket 11, the same being provided with a vertically disposed aperture 12 which is adapted to receive a hanger hereinafter more fully described.

Formed integral with or fixed to the forward end of the frame and to the sides of the centrally arranged bracket 11 are forwardly projecting brackets 13, the same being provided in their undersides with notches 14 which are adapted to receive keys or like retaining devices for hangers.

Arranged between the forward portions of the side members 10 is a horizontally disposed plate 15 on which is removably positioned a center bearing plate 16, the same being provided with a concave bearing face 17. This bearing face is adapted to receive the convex bearing face 18 of a center bearing plate 19, which latter is removably positioned on the underside of a transverse plate 20, the same being positioned between and rigidly fixed to the side members 21 of the locomotive frame.

The plates 15 and 20 and center bearing members 16 and 19 are provided with coinciding vertically disposed apertures which are adapted to receive a center or pivot pin 22. Formed integral with the upper portions of the side member 10 near the ends of transverse plate 15 are horizontally disposed plates 23 which serve as supports for friction plate bearings 24. These bearings are adapted to receive plano-convex bearing disks 25, the same serving as bearings for brackets 26 which project outwardly and downwardly from the side members 21 of the locomotive frame.

The rear portions of the side members 10 of our improved truck frame are arched as designated by 27 to provide pairs of vertically disposed pedestal jaws 28 which receive the usual journal boxes 20 of the trailer truck axle. The lower portions of these pedestal jaws are tied to each other in any suitable manner, preferably by means of bolts such as 30.

The upper portions of the arches 27 of the truck frame are divided or bifurcated to form longitudinally disposed pockets or openings 31 which receive semi-elliptic springs 32, the same bearing at their centers on the journal boxes 29 and their forward ends being connected to the truck frame 10 by means of suitable hangers 33.

The rear ends of the springs 32 are seated in suitable friction members 34, preferably in the form of vertically disposed loops which are mounted for sliding movement in the rear portions of the openings or pockets 31 and the upper ends of said loops being flat and serving as bearings for brackets 35 which depend from the rear portion of the locomotive frame.

The rear portions of the side members 10 of the frame are united by a transversely disposed rail 36 and formed on or fixed to the end portions thereof are depending brake hanger brackets 37. Mounted on the journal boxes for the axle of the rear driver wheels are the usual semi-elliptic springs 38 and supported in any suitable manner from the rear ends thereof is a transversely disposed equalizer bar 39. The central portion of this equalizer bar is adapted to receive the looped upper end of a hanger 40, the lower end of which passes through the aperture 12 in the bracket 11 and seated in the lower end of said hanger beneath said bracket is a key 41 or like fastening device. The equalizer bar 40 is also adapted to receive the upper ends of a pair of hangers 42, the lower ends of which are preferably bifurcated so as to engage the forwardly projecting brackets 13 and the lower ends of said last mentioned hangers receive keys or like fastening devices, the same being seated in the notches 14 in said brackets.

It will be understood that when the single center hanger 40 is utilized as a connection between the forward end of the truck frame and the equalizer bar 39 that the pair of side hangers 42 are dispensed with and vice versa, and further that when the single pivotal center bearing comprising the members 15 and 19 is used that the side bearings comprising the plates 24 and 25 are dispensed with and vice versa. However, when the side bearings are utilized and the center bearing members 17 and 19 are dispensed with, the pivot pin 22 is utilized to form a pivot connection between the forward portion of the truck frame and the locomotive frame. Further, the single front hanger 40 or the pair of hangers 42 may be used in connection with either the single pivotal center bearing or with the two side bearings. Such construction makes it possible to vary the points of connection between the truck frame and the locomotive frame, and likewise to vary the points of application of the load to said truck frame. For instance, where the forward end of the truck frame is supported by the single hanger 40, the two side bearings between the locomotive frame and the truck frame are dispensed with and the single pivotal center bearing is utilized, and as a result, the load is applied through the pivotal center bearing at a single point, namely, to the central portion of cross plate 15, and said truck frame is supported or connected to the locomotive frame at three points, namely, at the bracket 11 and at the journal boxes 29. (See Fig. 6.)

When the forward end of the truck frame is supported by the single hanger 40 and the friction pads comprising plano-convex bearing disks 25 are utilized the truck frame is supported or connected to the locomotive frame at three points, namely, at the bracket 15 and the journal boxes 29, and the load is applied to said frame at two points, namely, through the plano-convex bearing disks at the sides of said frame. When such arrangement is utilized, the pivot bearing members 16 and 19 are dispensed with, and the pin 22 is retained so that the truck frame is pivotally connected to the locomotive frame at a point between the points of application of the load and to the rear of the forward support which is the hanger 40. (See Fig. 8.)

When the pair of hangers 42 are utilized for supporting the forward end of the truck frame and the center bearing members 16 and 19 are utilized, the truck frame is connected to the locomotive frame at four points, namely, to the brackets 13 and at the journal boxes 29 while the load is applied to said truck frame at one point, namely, through the pivot plates 16 and 19. (See Fig. 7.) When the pair of hangers 42 are applied to the forward end of the frame and the friction pads comprising the plano-convex bearing disks 25 are utilized, the center bearing members 16 and 19 are dispensed with. Such arrangement provides for the application of the load to the truck frame at two points and said truck frame being connected to the locomotive frame at four points. (See Fig. 9.)

By utilizing springs 32 on the journal boxes of the trailer truck and providing the hangers 33 and friction members 34 between said springs and the truck frame, the rear portion of the latter is yieldingly supported and flexibly connected to the locomotive frame, and likewise the forward end of the truck frame is flexibly supported and yieldingly carried by the equalizer bar 39 and the hangers which connect the same with the brackets at the forward end of said truck frame.

A locomotive trailer truck of our improved construction is comparatively simple, and when formed in a single piece combines strength and rigidity, and the employment of our improved arrangement of connections between the truck and locomotive frames makes it possible to readily change or shift the points of application of the load to the truck frame, and likewise change the points of connection between said truck frame and the locomotive frame as may be required under variable conditions.

In Figs. 6 to 9 inclusive we have indicated the points of application of the load with the letter L, and the points of support or connection between said truck frame and locomotive frame with the letter S.

It will be readily understood that minor changes in the size, form and construction of the various parts of our improved trailer truck can be made and substituted for those herein shown and described, without departing from the spirit of our invention, the scope of which is set forth in the appended claims.

We claim:

1. The combination with a locomotive frame, of a trailer truck frame pivotally connected to the locomotive frame, springs bearing upon the journal boxes of the trailer truck, the forward ends of which springs are connected to the trailer truck frame and the rear ends of which springs support the rear portion of the locomotive frame and parts carried thereby, and friction elements interposed between the rear portions of the springs and the contacting parts of the locomotive frame.

2. The combination with a locomotive frame, of a trailer truck frame pivotally connected to the locomotive frame, springs bearing upon the journal boxes of the trailer truck, hangers connecting the forward portions of said springs with the trailer truck frame, the rear portions of which springs support the rear portion of the locomotive frame and parts carried thereby, an equalizer bar yieldingly supported on the locomotive frame above the forward portion of the trailer truck frame, and a connection between said equalizer bar and the forward end of the trailer truck frame.

3. The combination with a locomotive frame, of a trailer truck frame pivotally connected to the locomotive frame, springs bearing upon the journal boxes of the trailer truck, hangers connecting the forward portions of said springs with the trailer truck frame, the rear portions of which springs support the rear portion of the locomotive frame and parts carried thereby, an equalizer bar yieldingly supported on the locomotive frame above the forward portion of the trailer truck frame, a connection between said equalizer bar and the forward end of the trailer truck frame, and a removable center bearing arranged between the locomotive frame and trailer truck frame.

4. The combination with a locomotive frame, of a trailer truck frame pivotally connected to the locomotive frame, springs bearing upon the journal boxes of the trailer truck, hangers connecting the forward portions of said springs with the trailer truck frame, the rear portions of which springs support the rear portion of the locomotive frame and parts carried thereby, an equalizer bar yieldingly supported on the locomotive frame above the forward portion of the trailer truck frame, a connection between said equalizer bar and the forward end of the trailer truck frame, and side bearings removably positioned between the locomotive frame and trailer truck frame.

5. The combination with a locomotive frame, of a trailer truck frame, a hanger supporting the forward end of said truck frame, which hanger is yieldingly supported upon the locomotive frame, springs bearing upon the journal boxes of the trailer truck frame, connections between the forward ends of said springs and the trailer truck frame, and the rear ends of which springs support a portion of the locomotive frame and parts carried thereby.

6. The combination with a locomotive frame, of a trailer truck frame, a hanger supporting the forward end of said truck frame, which hanger is yieldingly supported upon the locomotive frame, springs bearing upon the journal boxes of the trailer truck frame, connections between the forward ends of said springs and the trailer truck frame, the rear ends of which springs support a portion of the locomotive frame and parts carried thereby, and a removable center bearing between the trailer truck frame and locomotive frame, which center bearing is positioned between the front hanger and the trailer truck axle.

7. The combination with a locomotive frame, of a trailer truck frame, a hanger supporting the forward end of said truck frame, which hanger is yieldingly supported upon the locomotive frame, springs bearing upon the journal boxes of the trailer truck, connections between the forward ends of said springs and the trailer truck frame, the rear ends of which springs support a portion of the locomotive frame and parts carried thereby, and a pair of removable side bearings arranged between the trailer truck frame and the locomotive frame between the support at the forward end of said truck frame and the trailer truck axle.

8. The combination with a locomotive frame, of a trailer truck frame pivotally connected to the locomotive frame, springs bearing upon the journal boxes of the trailer truck, connections between the forward ends of said springs and the trailer truck frame, the rear ends of which springs support a portion of the locomotive frame and parts carried thereby, an equalizer bar yieldingly supported upon the locomotive frame, and a pair of hangers depending from said equalizer bar and connected to the forward end of the trailer truck frame for supporting the same.

9. The combination with a locomotive frame, of a trailer truck frame, flexible connections between the rear end of said frame and the locomotive frame, yieldingly supported hangers carrying the forward end of the truck and a combined pivot and center bearing between the locomotive frame and truck frame at a point between said hangers and the trailer truck axle.

10. The combination with a locomotive frame, of a trailer truck frame, flexible connections between the rear end of said frame and the locomotive frame, yieldingly supported hangers carrying the forward end of the truck, a combined pivot and center bearing between the locomotive frame and truck frame at a point between said hangers and the trailer truck axle, and removable side bearings arranged between the locomotive frame and trailer truck frame.

11. The combination with a locomotive frame, of a trailer truck frame pivotally connected to the locomotive frame at a point between the forward end of said truck frame and the trailer truck axle, an equalizer bar yieldingly carried upon the locomotive frame, and means for selectively supporting the forward end of the truck frame at one or more points from said equalizer bar.

12. The combination with a locomotive frame and a trailer truck frame, of means for selectively arranging the points of support between said truck frame and the locomotive frame, and means for selectively locating the points of application of the load to said truck frame.

13. The combination with a locomotive frame and a trailer truck frame, of means for varying the points of support between the forward portion of the trailer truck frame and the locomotive frame, and means for selectively locating the points of application of the load to said trailer truck frame.

14. The combination with a locomotive frame, of a trailer truck frame pivotally connected to said locomotive frame, a member yieldingly supported upon the locomotive frame, and means for selectively supporting the forward portion of the truck frame at one or more points from said yieldingly supported member.

15. The combination with a locomotive frame, of a trailer truck frame pivotally connected to the locomotive frame, journal boxes for the trailer truck axle, springs supported by said journal boxes, hangers between the forward ends of said springs and the trailer truck frame, and friction members coöperating with the rear ends of said springs for supporting parts carried by the locomotive frame.

In testimony whereof we hereunto affix our signatures in the presence of two witnesses, this 10th day of March, 1915.

CHARLES F. FREDE.
CHARLES T. WESTLAKE.

Witnesses:
HAL C. BELLVILLE,
M. P. SMITH.